US010154048B2

(12) United States Patent
Krishnamurthi et al.

(10) Patent No.: US 10,154,048 B2
(45) Date of Patent: Dec. 11, 2018

(54) METHODS AND SYSTEMS FOR LOCATION-BASED AUTHENTICATION USING NEIGHBORING SENSORS

(71) Applicant: QUALCOMM Incorporated, San Diego, CA (US)

(72) Inventors: Govindarajan Krishnamurthi, Palo Alto, CA (US); Saumitra Mohan Das, Santa Clara, CA (US); Rajarshi Gupta, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 154 days.

(21) Appl. No.: 15/074,745

(22) Filed: Mar. 18, 2016

(65) Prior Publication Data

US 2017/0272450 A1    Sep. 21, 2017

(51) Int. Cl.
*G06F 11/00* (2006.01)
*H04L 29/06* (2006.01)
(Continued)

(52) U.S. Cl.
CPC .......... *H04L 63/1416* (2013.01); *G06F 21/35* (2013.01); *G08G 1/0112* (2013.01);
(Continued)

(58) Field of Classification Search
CPC ............... H04L 63/1408; H04L 63/145; H04L 41/0659; H04L 41/145; H04L 41/16; G06F 15/80
(Continued)

(56) References Cited

U.S. PATENT DOCUMENTS 8,718,910 B2    5/2014  Gueziec et al.
8,989,954 B1 *  3/2015  Addepalli ............. H04W 4/046
                                                          701/32.3
(Continued)

FOREIGN PATENT DOCUMENTS

WO    2007092549 A1    8/2007

OTHER PUBLICATIONS

Dolberg L., et al., "Tracking Spoofed Locations in Crowdsourced Vehicular Applications," IEEE Network Operations and Management Symposium (NOMS), May 2014, URL:http://ieeexplore.ieee.org/xpls/absall.jsp?arnumber=6838252&tag=1, pp. 1-9.
(Continued)

*Primary Examiner* — Gary S Gracia
(74) *Attorney, Agent, or Firm* — Jae-Hee Choi; The Marbury Law Group (57) ABSTRACT

Various embodiments include methods, and computing devices implementing the methods, for authenticating vehicle information by polling selected sensors. A server computing device receiving vehicle information from a reporting vehicle may compare the received vehicle information to contextual information to generate a comparison result, and determine whether the received vehicle information should be evaluated with greater scrutiny based on the comparison result. The server computing device may select sensors for polling based on the received vehicle information (and in response to determining that the received vehicle information should be evaluated with greater scrutiny), and poll the selected sensors to received sensor information. The server computing device may use the received sensor information to corroborate the received vehicle information, and perform a responsive action based on the result of the corroboration.

30 Claims, 6 Drawing Sheets

(51) Int. Cl.
*H04W 4/04* (2009.01)
*H04W 4/40* (2018.01)
*G06F 21/35* (2013.01)
*G08G 1/01* (2006.01)
*G06F 12/14* (2006.01)
*H04L 29/08* (2006.01)

(52) U.S. Cl.
CPC ........... *H04L 63/107* (2013.01); *H04W 4/046* (2013.01); *H04W 4/40* (2018.02); *G06F 2221/2111* (2013.01); *H04L 63/145* (2013.01); *H04L 67/12* (2013.01)

(58) Field of Classification Search
USPC .......................... 706/12; 726/23, 24; 712/11
See application file for complete search history.

(56) References Cited

U.S. PATENT DOCUMENTS

| | | | | |
|---|---|---|---|---|
| 9,381,916 | B1* | 7/2016 | Zhu | B60W 30/0956 |
| 9,495,874 | B1* | 11/2016 | Zhu | G05D 1/0088 |
| 9,525,700 | B1* | 12/2016 | Malinowski | H04L 63/1408 |
| 2010/0279647 | A1 | 11/2010 | Jacobs et al. | |
| 2012/0083960 | A1* | 4/2012 | Zhu | G06T 7/223 |
| | | | | 701/23 |
| 2014/0095016 | A1* | 4/2014 | Suganuma | G07C 5/00 |
| | | | | 701/32.1 |
| 2014/0314275 | A1* | 10/2014 | Edmondson | G06K 9/00771 |
| | | | | 382/103 |
| 2015/0032366 | A1 | 1/2015 | Man et al. | |
| 2015/0088835 | A1 | 3/2015 | Davis | |
| 2015/0149088 | A1* | 5/2015 | Attard | G01C 21/36 |
| | | | | 701/538 |
| 2015/0246672 | A1* | 9/2015 | Pilutti | B60W 30/00 |
| | | | | 701/2 |
| 2015/0266455 | A1* | 9/2015 | Wilson | G09B 19/10 |
| | | | | 701/93 |
| 2015/0310744 | A1* | 10/2015 | Farrelly | G06Q 10/063114 |
| | | | | 340/932.2 |
| 2015/0314780 | A1* | 11/2015 | Stenneth | B60W 30/00 |
| | | | | 701/23 |
| 2016/0133131 | A1* | 5/2016 | Grimm | B60W 40/068 |
| | | | | 701/117 |
| 2016/0284154 | A1* | 9/2016 | Schraga | G07C 1/30 |

OTHER PUBLICATIONS

Zaidi K., et al., "Vehicular Internet: Security & Privacy Challenges and Opportunities," Future Internet, Received: Apr. 28, 2015 / Accepted: Jul. 9, 2015 / Published: Jul. 24, 2015, vol. 7, pp. 257-275.
International Search Report and Written Opinion—PCT/US2017/019062—ISA/EPO—May 4, 2017.

* cited by examiner

METHODS AND SYSTEMS FOR LOCATION-BASED AUTHENTICATION USING NEIGHBORING SENSORS

BACKGROUND

In recent years, technology companies have begun developing and implementing technologies that allow an automobile to drive itself. These so called "self-driving cars" control the vehicle based on information collected from the cloud and the car's sensors, processors, and other electronics. As these self-driving car technologies grow in popularity and use, so will the importance of protecting motor vehicles from malfunction, malware and attacks. Due to these emerging trends, new and improved solutions that better identify, prevent and respond to misinformation, malware and cyber attacks on modern vehicles, such as autonomous vehicles and self driving cars, will be beneficial to consumers.

SUMMARY

Various embodiments include methods of determining the veracity of vehicle information, including receiving in a server computing device the vehicle information from a reporting vehicle, and comparing, in the server computing device, the received vehicle information to contextual information to generate a comparison result. Various embodiments may further include determining, in the server computing device, whether the received vehicle information should be evaluated based on the comparison result, and identifying, by the server computing device, sensors for polling based on the received vehicle information and in response to determining that the received vehicle information should be evaluated. Various embodiments may further include polling, by the server computing device, identified sensors to receive sensor information, and corroborating, in the server computing device, the received vehicle information based on the received sensor information.

Some embodiments may further include determining, in the server computing device, whether to perform a responsive action based on a result of the corroboration. In some embodiments, corroborating the received vehicle information based on the received sensor information may include the server computing device comparing the received vehicle information to the received sensor information. In some embodiments, corroborating vehicle information based on the received sensor information may include applying, in the server computing device, the received vehicle information to a first behavior model to generate a first value, applying, in the server computing device, received sensor information to a second behavior model to generate a second value, and labeling, by the server computing device, the vehicle information as corroborated in response to determining that a difference between the first value and the second value exceeds a threshold value. In some embodiments, identifying the sensors for polling based on the received vehicle information may include the server computing device identifying spatially relevant sensors based on location information included in the vehicle information.

In some embodiments, identifying the sensors for polling based on the received vehicle information may include determining, in the server computing device, an applicable location based on the received vehicle information, identifying, by the server computing device, a vehicle that is in close proximity to the applicable location, and identifying, by the server computing device, a sensor that is included in the identified vehicle. In some embodiments, identifying the sensors for polling based on the received vehicle information may include the server computing device identifying a fixed road sensor based on the received vehicle information.

Some embodiments may further include determining, in the server computing device, a number of sensors that should be polled in order to corroborate the vehicle information, in which identifying the sensors for polling based on the received vehicle information may include selecting the determined number of sensors for polling. Some embodiments may further include determining whether the received vehicle information is corroborated by the received sensor information, storing the received vehicle information in a database in response to determining that the received vehicle information is corroborated by the received sensor information, and discarding the received vehicle information in response to determining that the received vehicle information is not corroborated by the received sensor information. Some embodiments may further include determining whether the reporting vehicle is infected with malware in response to determining that the received vehicle information is not corroborated by the received sensor information.

Further embodiments may include a computing device that includes a processor configured with processor-executable instructions to perform operations of the methods summarized above. Further embodiments may include a non-transitory computer readable storage medium having stored thereon processor-executable software instructions configured to cause a processor in a server computing device to perform operations of the methods summarized above. Further embodiments may include a computing device that includes means for perform functions of the methods summarized above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In overview, the various embodiments include methods, and server computing devices configured to implement the methods, for intelligently and efficiently corroborating information that is received from a vehicle (e.g., an automobile, autonomous vehicle, a self-driving car, etc.) to determine the reliability of the information for various uses, identify malware, and make better or more informed decisions. A server computing device may be configured to receive vehicle information from a reporting vehicle, compare the received vehicle information to contextual information, and use the result of the comparison to determine whether the received vehicle information should be evaluated with greater scrutiny. In response to determining that the received vehicle information should be evaluated with greater scrutiny, the server computing device may intelligently select other sensors, such as sensors in other vehicles, for polling based on the content or context of the received vehicle information. The server computing device may then poll the selected sensors to receive sensor information, and use the received sensor information to corroborate the received vehicle information and/or determine the veracity of the received vehicle information. The server computing device may select and perform a responsive action, or intelligently determine whether to perform a responsive action, based on the results of the corroboration or veracity of the information.

Over the past several years, the modern automobile has been transformed from a self-propelled mechanical vehicle into a powerful and complex electro-mechanical system that includes a large number of processors, sensors, and systems-on-chips (SOCs) that control many of the vehicle's functions, features, and operations. Manufacturers now equip their automobiles with Advanced Driver Assistance Systems (ADASs) that automate, adapt, or enhance the vehicle's operations. For example, an ADAS may be configured to use information collected from the automobile's sensors (e.g., accelerometer, radar, lidar, geospatial positioning, etc.) to automatically detect a potential road hazard, and assume control over all or a portion of the vehicle's operations (e.g., braking, steering, etc.) to avoid detected hazards. Features and functions commonly associated with an ADAS include adaptive cruise control, automated lane detection, lane departure warning, automated steering, automated braking, and automated accident avoidance.

Modern vehicles may also be equipped with a vehicle control system, which may be configured to collect and use information from the vehicle's various components, systems and sensors (collectively "sensors") to automate all or a portion of the vehicle's operations. The vehicle control system may also be configured to communicate with a server computing device in a cloud network to receive information suitable for intelligently controlling the vehicle's operations. For example, the vehicle control system may receive and use information from the server computing device to determine that there has been a change in circumstances (e.g., a change in the traffic pattern, a road closure, an emergency, etc.), and select an alternate navigation route based on the received information. The vehicle control system may also collect and send information (vehicle information, sensor information, etc.) to the server computing device for analysis and use in controlling the operations of the other vehicles in the system.

In the various embodiments, the server computing device may be configured to receive vehicle information from a reporting vehicle, use the received vehicle information to make intelligent control decisions, and send control or guidance information to select vehicles (e.g., vehicles that are in the same geographic area as the reporting vehicle, etc.) to aid those vehicles in controlling their operations. For example, the server computing device may determine, based on the received vehicle information, that a particular road is blocked. In response, the server computing device may generate and send control or guidance information to vehicles that are scheduled to travel on that road to cause those vehicles to select or follow (or to aid autonomous driving systems in those vehicles to select) an alternate navigation route.

The development of autonomous and semi-autonomous vehicles may lead to autonomous decision making becoming centralized in remote computing devices (e.g., in a server computing device or in the "Cloud"), decentralized in individual vehicle control systems, or partially decentralized (e.g., lane following, navigation, emergency braking, etc.) and partially centralized (e.g., speed control, convoy formation, etc.). Thus, the information provided to vehicles by a server computing device (or the Cloud) in the various embodiments may include control information for centralized control of vehicles, guidance information to enable individual vehicle control systems to make autonomous driving decisions, or a combination of control information (e.g., maximum speed settings) and guidance information (e.g., information regarding road conditions, traffic, etc.). For ease of reference, the term "control information" is used in the description of the various embodiments and implementations to refer collectively to control information, guidance information, and a combination of control and guidance information.

In a world of autonomous and semi-autonomous vehicles, the introduction of malware or unauthorized access to control algorithms could be catastrophic. In order to protect the vehicles from malware, and make better or more informed decisions, the server computing device may evaluate and corroborate the received vehicle information (e.g., information indicating that the road is blocked) before making a control decision or taking a responsive action (e.g., sending the control information, etc.). For example, before instructing or advising vehicles to follow an alternate navigation route, the server computing device may corroborate the received vehicle information to ensure/verify that the road is indeed blocked. By corroborating the information, the server computing device also ensures that the reporting vehicle has not been infected by malware and/or is not experiencing a cyber attack.

In some embodiments, the server computing device may be configured to compare the received vehicle information to contextual information to generate a comparison result, use the comparison result to determine whether the received vehicle information should be evaluated with greater scrutiny. This automated process allows the server computing device to request corroboration only when received vehicle information is suspicious or otherwise requires greater scrutiny.

For example, the server computing device may receive vehicle information from a reporting vehicle that indicates a particular road in San Diego is blocked. The server computing device may retrieve contextual information (e.g., from memory, a database, etc.) that indicates that the reporting vehicle is registered in New York City and/or was in Philadelphia within the past 48 hours. Based on this information, the server computing device may determine that there is a discrepancy between the received vehicle information and the contextual information (e.g., due to the large distance that vehicle would have had to travel). In response, the server computing device may mark the received vehicle information as suspicious information that requires greater scrutiny, and corroborate the information before using it to make an important control decision.

The server computing device may be configured to intelligently select sensors for polling in response to determining that the received vehicle information requires corroboration or greater scrutiny. In some embodiments, the server computing device may select the sensors based on the content or context of the received vehicle information. For example, when the received vehicle information indicates that a road is closed, the server computing device may select for polling only spatially relevant sensors, such as sensors that are included in vehicles that are in the same general location as the reporting vehicle, sensors that are in the same geographical area as a reported emergency, road sensors that are positioned on or near a road of interest, or any other sensor that is located in an area that is determined to be relevant or important for collecting corroboration data. In some embodiments, the server computing device may select the sensors based on results of machine learning applied to the content or context of the received vehicle information in view of historical data.

The server computing device may be configured to poll the selected sensors to receive sensor information that is suitable for use in corroborating the vehicle information. The server computing device may poll the selected sensors via unicast, multicast, broadcast, datacasting, peer transmissions, busy-wait polling, hub polling, cycle polling, periodic polling, or any polling or broadcast technique known in the art or contemplated in the future. In some embodiments, the server computing device may poll the selected sensors by broadcasting or transmitting a control message to the sensors (or a vehicle control system in a vehicle that includes the sensor). The control message may include information suitable for causing the sensors (or vehicle control system) to activate, collect sensor information, and send the collected information to the server computing device. The word "broadcast" is used herein to mean the transmission of messages or data (files, information packets, etc.) so that the messages/data can be received by a large number of receiving devices simultaneously, and includes multicast.

The server computing device may corroborate the vehicle information using machine learning techniques. For example, the server computing device may compare the received vehicle information to the received sensor information by applying the received vehicle information to a first behavior model to generate a first value, applying received sensor information to a second behavior model to generate a second value, computing a difference value that identifies the difference between the first value and the second value, comparing the difference value to a threshold value to determine whether the difference value exceeds the threshold value. The server computing may mark/label the vehicle information as corroborated in response to determining that the difference between the first value and the second value exceeds the threshold value.

In some embodiments, the server computing device may be configured to corroborate the vehicle information by determining whether the sensor and vehicle information include the same types of information (e.g., velocity information, etc.), and comparing information of the same type. In response to determining that the sensor and vehicle information do not include the same types of information (or are otherwise not comparable), the server computing device may process or transform the information into values that are more readily comparable. In some embodiments this may be accomplished using machine learning techniques. For example, the server computing device may apply received vehicle information to a first model to generate a vehicle value, apply received sensor information to a second model to generate a sensor value, and compare the vehicle value to the sensor value to determine whether to mark/label the received vehicle information as corroborated, authenticated, trusted, valid, etc. The server computing device may select a control operation, or determine whether to perform a responsive action, based whether the vehicle information is marked/labeled as corroborated.

In an embodiment, the server computing device may select sensors for polling by using the received vehicle information to identify an sensors for polling applicable location (e.g., the location of an reporting vehicle, segment of a road reported as blocked, area near a reported emergency, etc.), identifying a vehicle that is in close proximity to the applicable location, and selecting the sensors included in the identified vehicle for polling.

In an embodiment, the server computing device may be configured to use machine intelligence algorithms to determine the number of sensors that should be polled in order to collect data that is sufficient for corroborating the vehicle information, determine the number of sensors that are suitable or available for polling, and select for polling the only the determined number of the suitable/available sensors.

The various embodiments may be implemented and used in a variety of vehicle-based systems and solutions. For example, the various embodiments may be implemented in any computing system that controls the operations, components, sensors, features or functions of a vehicle, including the vehicle control systems of automobiles and/or server computing devices deployed in a cloud network and configured to monitor or control the operations of automobiles. While the various embodiments and implementations are particularly useful in vehicle-based systems, embodiments may be implemented and used in any system or device that includes a processor for executing application programs, a sensor for collecting data, and communications circuitry for sending and receiving information.

Figure 1A:
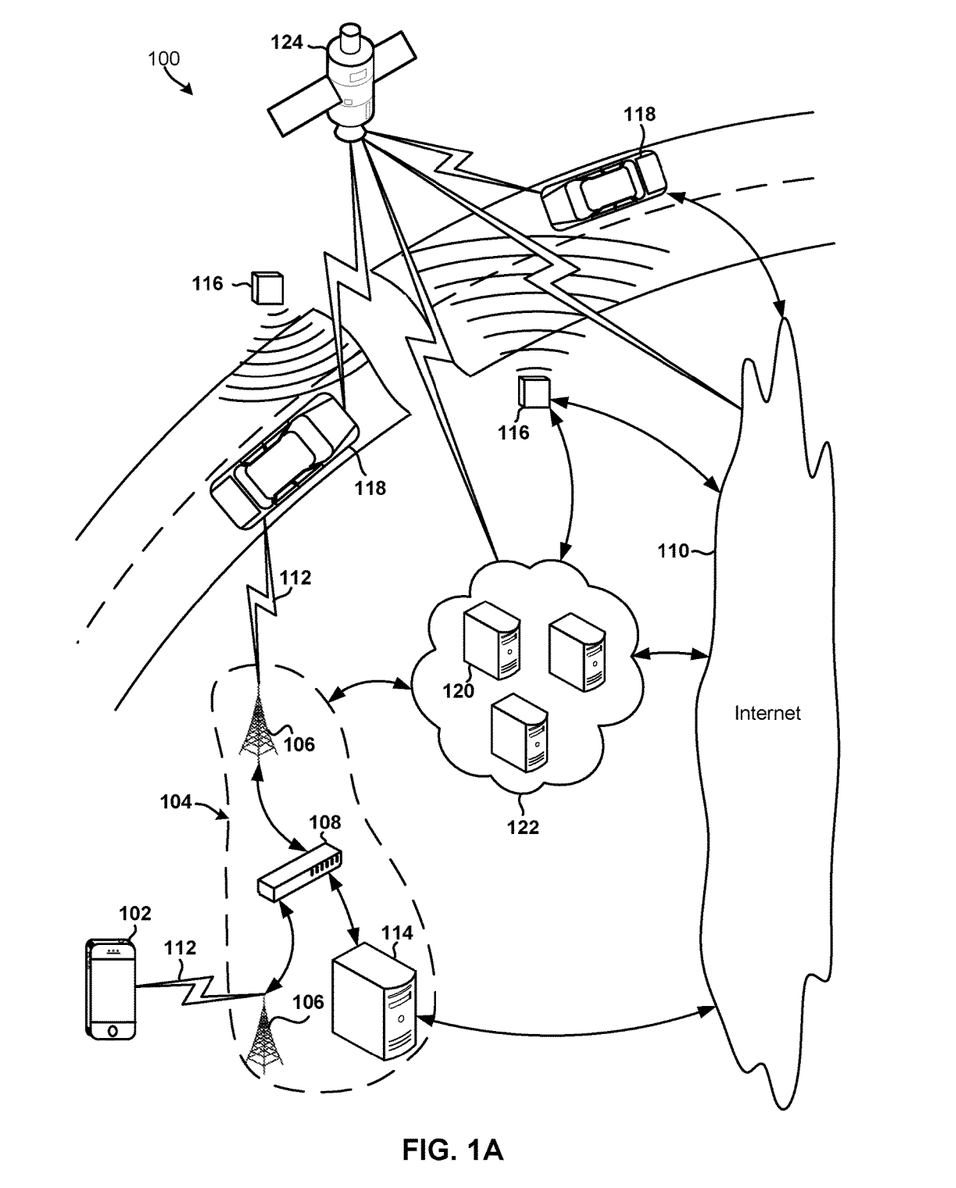
FIG. 1A is a communication system block diagram illustrating network components in an example vehicle-based system that is suitable for implementing the various embodiments.

The various embodiments may be implemented within a variety of communication systems, such as the example vehicle-based system 100 illustrated in FIG. 1A. A typical cell telephone network 104 includes a plurality of cell base stations 106 coupled to a network operations center 108, which operates to connect voice calls and data between mobile devices 102 (e.g., cell phones, laptops, tablets, etc.), road sensors 116, vehicles 118, and other network destinations, such as via telephone land lines (e.g., a plain ordinary telephone system (POTS) network, not shown) and the Internet 110. The telephone network 104 may also include one or more servers 114 coupled to or within the network operations center 108 that provide a connection to the Internet 110.

The vehicles 118 may include hardware and/or software components suitable for monitoring and collecting sensor information from the vehicle's various sensors. Examples of vehicle sensors that may be monitored include the vehicle's speedometer, wheel speed sensor, torquemeter, turbine speed sensor, variable reluctance sensor, sonar system, radar system, air-fuel ratio meter, water-in-fuel sensor, oxygen sensor, crankshaft position sensor, curb feeler, temperature sensor, Hall effect sensor, manifold absolute pressure sensor, fluid sensors (e.g., engine coolant sensor, transmission fluid sensor, etc.), tire-pressure monitoring sensor, mass airflow sensor, speed sensor, throttle position sensor, blind spot monitoring sensor, parking sensor, speakers, cameras, microphones, accelerometers, compasses, GPS receivers, and other similar sensors for monitoring physical or environmental conditions in and around the vehicle.

The vehicles 118 may include communications circuitry for communicating with a network server 120, which may be implemented as a server within the network infrastructure of a cloud service provider network 122 and connected to the Internet 110 and the telephone network 104. The vehicles 118 may also include communications circuitry for communicating with one or more satellite or space-based systems 124, such as a global positioning system (GPS) or another navigation or positioning system.

Communications between the network server 120, road sensors 116, and the vehicles 118 may be achieved through the telephone network 104, the Internet 110, a cloud service provider network 122, private networks (not illustrated), or any combination thereof. Communications between the vehicles 118 and the telephone network 104 may be accomplished via two-way wide-area wireless communication links 112, such as cellular telephone communication technologies. A number of different cellular and mobile communication services and standards are available or contemplated in the future, all of which may be used for communications of the various embodiments. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UNITS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iden). Each of these technologies involves, for example, the transmission and reception of voice, data, signaling, and/or content messages.

The network server 120 may send data and control information to vehicles 118, which may receive and use the information to perform a responsive operation or provide a function. For example, each of the vehicles 118 may include an Advanced Driver Assistance System (ADASs) that is controlled by a vehicle control system. The vehicle control system may receive and use the information from the network server 120 to determine that there has been a change in circumstances (e.g., a detected hazard, a change in the traffic pattern, a road closure, etc.), and instruct the ADAS system to alter the vehicle's operations (e.g., braking, steering, etc.). The vehicle control system may also be configured to receive a control message from the network server 120, and in response, activate various sensors (e.g., accelerometer, radar, lidar, GPS receiver, roadbed sensors, etc.) to collect and send sensor information to the network server 120. In addition, the vehicle control system may be configured to collect and report vehicle information to the network server 120 periodically, on-demand, continuously, repeatedly, in response to a trigger, in response to detecting the occurrence of an event, etc.

The road sensors 116 may be configured to collect and send sensor information to the vehicles 118 or the network server 120, such as in response to receiving a control message from the network server 120, in response to receiving an information request message from the vehicles 118, in response to detecting a condition or event (e.g., a sudden change in vehicle speeds, etc.), periodically, etc. The vehicles 118 may report the information received from road sensors 116 to the network server 120 and/or use the received information to make better or more informed decisions, such as whether to instruct the ADAS system to apply the brakes. The network server 120 may use the information received from road sensors 116 (e.g., vehicle information) to make control decisions. The network server 120 may also use the information received from road sensors 116 (e.g., sensor information) to corroborate information received from other sensors, such as the vehicle information received from the other road sensors 116 or vehicles 118.

Figure 1B:
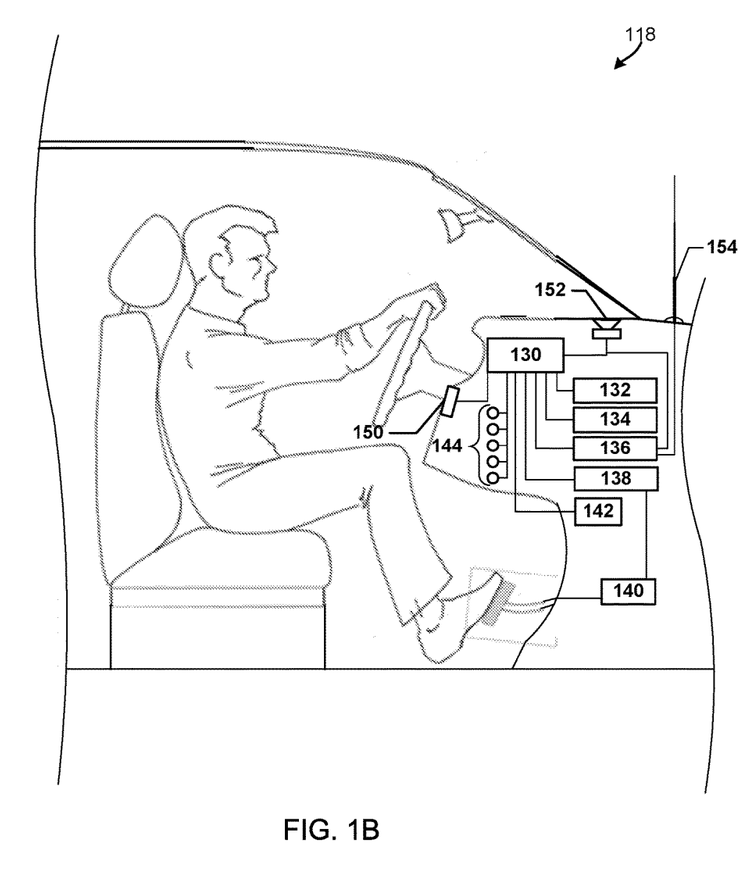
FIG. 1B is a component block diagram illustrating logical components of a vehicular control system suitable for implementing the various embodiments.

FIG. 1B is a component block diagram of an example vehicle 118 including a vehicle control system 130 and various sensors suitable for interacting with a server computing device 120 according to various embodiments. Vehicular system may include the vehicle control system 130 coupled to a variety of vehicle systems and subsystems, such as an environmental system 132 (e.g., an air conditioning system), a navigation system 134, a voice and communications capability that may be implemented as an "infotainment" system 136, an engine control system 138, a transmission control system 142, and a variety of sensors 144. The engine control system 138 may be coupled to one or more pedal sensors 140. The vehicle control system 130 may communicate with a server computing device 120 using the infotainment system 136, which may be coupled to an antenna 154 to send and receive data via various wireless wide-area networks, as well as receive wireless broadcasts. The vehicle control system 130 and the infotainment system 136 may be coupled to a speaker 152 to generate sound within the vehicle. The navigation system 134 may be coupled to a display 150 to display vehicle status/control and navigation information (e.g., a map). Each vehicle systems and sensors 130-144 may communicate with one or more other systems via one or more communication links, which may include wired communication links (e.g., a Controller Area Network (CAN) protocol compliant bus, Universal Serial Bus (USB) connection, Firewire connection, etc.) and/or wireless communication links (e.g., a Wi-Fi® link, Bluetooth® link, ZigBee® link, ANT+® link, etc.).

The variety of sensors 144 coupled to the vehicle control system 130 may include any of the vehicle's speedometer, wheel speed sensor, torquemeter, turbine speed sensor, variable reluctance sensor, sonar system, radar system, air-fuel ratio meter, water-in-fuel sensor, oxygen sensor, crankshaft position sensor, curb feeler, temperature sensor, Hall effect sensor, manifold absolute pressure sensor, various fluid sensors (e.g., engine coolant sensor, transmission fluid sensor, etc.), tire-pressure monitoring sensor, mass airflow sensor, speed sensor, blind spot monitoring sensor, parking sensor, cameras, microphones, accelerometers, compasses, GPS receiver, and other similar sensors for monitoring physical or environmental conditions in and around the vehicle.

The aforementioned systems are presented merely as examples, and vehicles may include one or more additional systems that are not illustrated for clarity. Additional systems may include systems related additional functions of the vehicular system, including instrumentation, airbags, cruise control, other engine systems, stability control parking systems, tire pressure monitoring, antilock braking, active suspension, battery level and/or management, and a variety of other systems.

Figure 2:
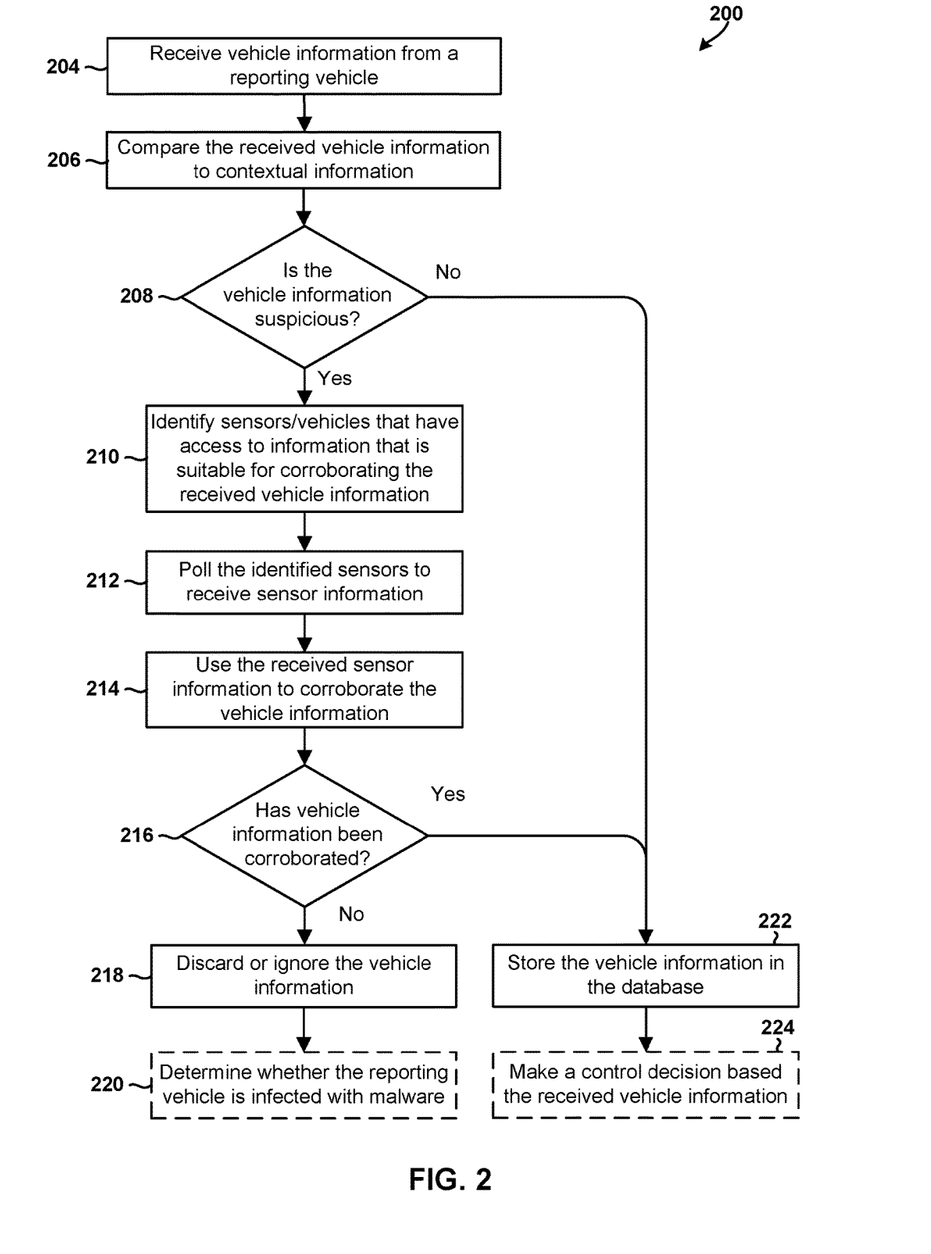
FIG. 2 is a process flow diagram illustrating a method of determining the veracity of vehicle information to make better or more informed control decisions in accordance with an embodiment.

FIG. 2 illustrates a method 200 for determining the veracity of vehicle information received in a server computing device from a vehicle and making better or more informed control decisions in accordance with an embodiment. Method 200 may be performed by a processor in a server computing device, such as the network server 120 discussed above.

In block 204, the server/processor may receive vehicle information from a reporting vehicle. In block 206, the server/processor may compare the received vehicle information to contextual information (retrieved from a database) to generate a result that is suitable for use in determining whether the received vehicle information includes suspicious information that should be evaluated with greater scrutiny. In determination block 208, the server/processor may determine whether the vehicle information includes suspicious information that should be evaluated with greater scrutiny. For example, the server/processor may compare the received vehicle information to other information known to the server computing device, such as previous reports from the same vehicle, reports received from other vehicles, information in a road condition database, etc.

In response to determining that the vehicle information includes suspicious information (i.e., determination block 208="Yes"), the server/processor may identify sensors/vehicles that have access to information that is suitable for corroborating the received vehicle information in block 210. In some embodiments, the server computing device may select the sensors based on the content or context of the received vehicle information. In some embodiments, the server computing device may select the sensors based on results of machine learning applied to the content or context of the received vehicle information in view of historical data. In some embodiments, the server computing device may select sensors for polling by identifying spatially relevant sensors based on location information included in the received vehicle information. In an embodiment, the server computing device may select sensors for polling by using the received vehicle information to identify an applicable location (e.g., the location of an reporting vehicle, segment of a road reported as blocked, area near a reported emergency, etc.), identifying a vehicle that is in close proximity to the applicable location, and selecting the sensors included in the identified vehicle for polling.

In some embodiments, in block 210, the server/processor may identify sensors for polling by identifying a fixed road sensor based on the received vehicle information and/or by determining an applicable location based on the received vehicle information, identifying a vehicle that is in close proximity to the applicable location, and identifying a sensor that is included in the identified vehicle. In an embodiment, in block 210, the server/processor may also determine the number of sensors that should be polled in order to corroborate the vehicle information, and select the determined number of sensors for polling.

In block 212, the server/processor may poll the identified sensors (via broadcast, multicast, etc.) to receive sensor information. The server computing device may poll the selected sensors via unicast, multicast, broadcast, datacasting, peer transmissions, busy-wait polling, hub polling, cycle polling, periodic polling, or any polling or broadcast technique known in the art or contemplated in the future. In some embodiments, the server computing device may poll the selected sensors by broadcasting or transmitting a control message to the sensors (or a vehicle control system in a vehicle that includes the sensor). The control message may include information suitable for causing the sensors (or vehicle control system) to activate, collect sensor information, and send the collected information to the server computing device.

In block 214, the server/processor may use the received sensor information to corroborate the vehicle information or verify the veracity of the suspicious information. For example, the server computing device may compare the received vehicle information to the received sensor information by applying the received vehicle information to a first behavior model to generate a first value, applying received sensor information to a second behavior model to generate a second value, computing a difference value that identifies the difference between the first value and the second value, comparing the difference value to a threshold value to determine whether the difference value exceeds the threshold value.

Thus, in blocks 206 through 214, the server/processor may compare the received vehicle information to contextual information to generate a comparison result. Based on the comparison result, the server/processor may determine whether the received vehicle information should be evaluated. In response to determining that the received vehicle information should be evaluated, the server/processor may identify sensors for polling based on the received vehicle information, and poll identified sensors to receive sensor information. The server/processor may then corroborate the received vehicle information based on the received sensor information. In some embodiments, the server/processor may be configured to corroborate the received vehicle information by comparing the received vehicle information to directly the received sensor information. In other embodiments, server/processor may be configured to corroborate the received vehicle information by applying the received vehicle information to a first behavior model to generate a first value, applying received sensor information to a second behavior model to generate a second value, and labeling the vehicle information as corroborated in response to determining that a difference between the first value and the second value exceeds a threshold value.

In determination block 216, the server/processor may determine whether the vehicle information has been successfully corroborated or verified. In some embodiments, the server/processor be configured to determine whether to perform a responsive action based on a result of the corroboration.

In the example illustrated in FIG. 2, in response to determining that the vehicle information has not been successfully corroborated or verified (i.e., determination block 216="No"), the server/processor may discard or ignore the vehicle information in block 218. In optional block 220, the server/processor may determine whether the reporting vehicle has been infected with malware or is experiencing a cyber attack. In some embodiments, this may be accomplished by sending a control message to the reporting vehicle that includes information suitable for invoking a malware detection system in the reporting vehicle.

In response to determining that the vehicle information does not include suspicious information (i.e., determination block 208="No") or that the vehicle information has been successfully corroborated or verified (i.e., determination block 216="Yes"), the server/processor may store the received vehicle information in a database in block 222. In optional block 224, the server/processor may make an intelligent control decision based on the received vehicle information. For example, in block 224, the server/processor may generate and send control information to all of the vehicles in the system that are scheduled to travel on a road that is indicated as blocked in the received vehicle information to cause those vehicles to select and follow an alternate navigation route.

Figure 3:
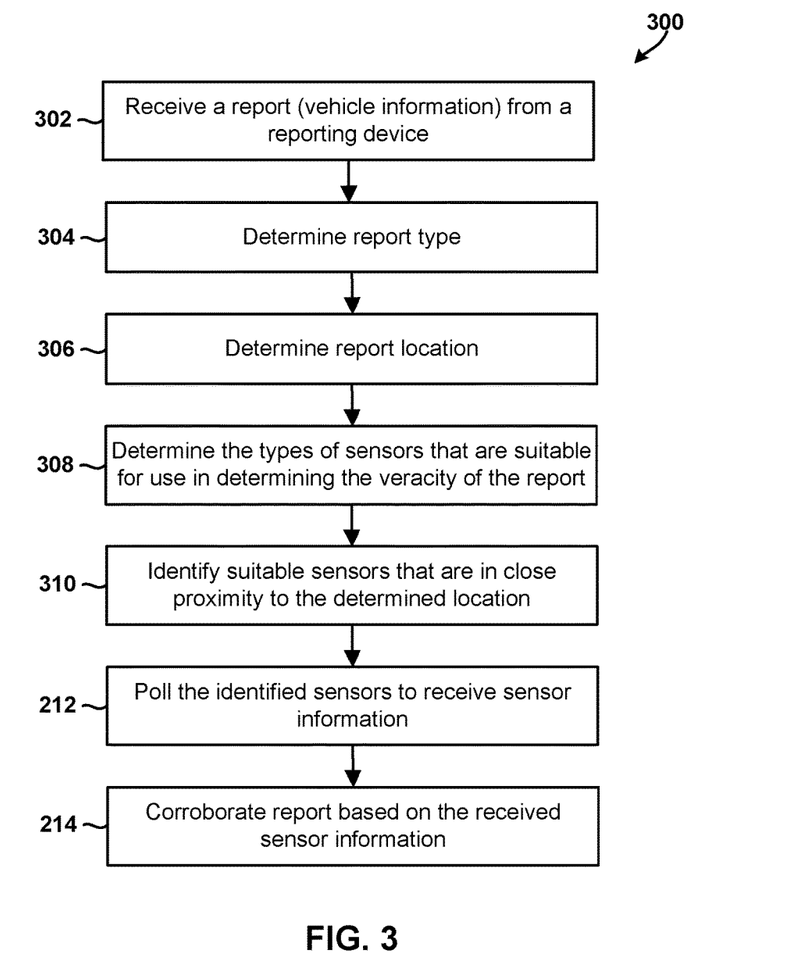
FIG. 3 is a process flow diagram illustrating a method of validating a report from a motor vehicle in accordance with an embodiment.

FIG. 3 illustrates a method 300 of validating a report in accordance with an embodiment. The method 300 may be performed by a processor in a server computing device, such as the network server 120 discussed above with reference to FIG. 1A.

In block 302, the server/processor may receive a report from a reporting device. For example, the server/processor may receive vehicle information from a reporting vehicle that indicates a road is blocked.

In block 304, the server/processor may determine a report type for the received report. For example, the server/processor may determine whether the report includes movement type information (e.g., a vehicle's speed, etc.) or event type information (e.g., a road closure, etc.).

In block 306, the server/processor may determine a location for the received report based on the information included in the report. For example, the server/processor may determine the location of a road that the report indicates is blocked. As another example, the server/processor may determine the location of a reporting vehicle/device if the report includes traffic congestion information.

In block 308, the server/processor may determine the types of sensors that are suitable for use in determining the veracity of the report. In block 310, the server/processor may identify the suitable sensors (i.e., the sensors determined to be suitable for use in determining the veracity) that are in close proximity to the determined location.

In block 212, the server/processor may poll the identified sensors to receive sensor information as described for like the number block in FIG. 2. In block 214, the server/processor may validate the veracity of the report based on the received sensor information, such as by corroborating the information included in the report based on the received sensor information as described for the like number block in FIG. 2.

Figure 4:
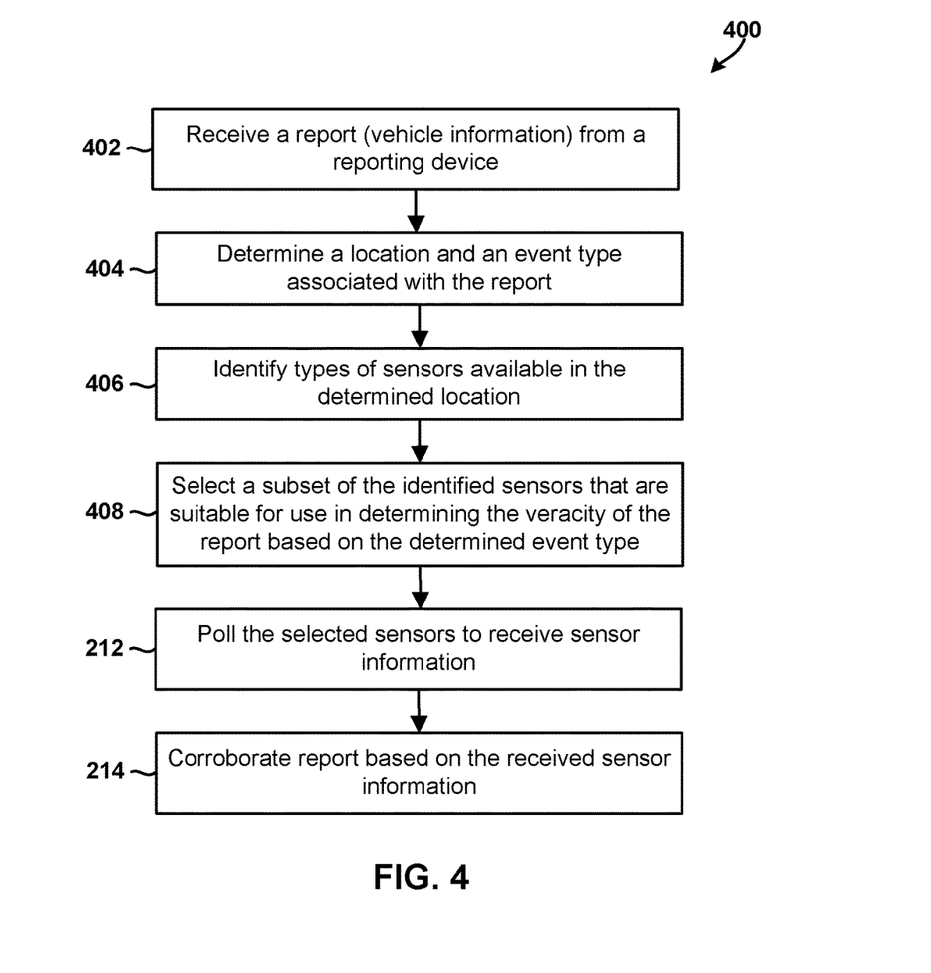
FIG. 4 is a process flow diagram illustrating a method of validating a report from a motor vehicle in accordance with another embodiment.

FIG. 4 illustrates a method 400 of validating a report in accordance with another embodiment. The method 400 may be performed by a processor in a server computing device, such as the network server 120 discussed above with reference to FIG. 1A.

In block 402, the server/processor may receive a report from a reporting device. In block 404, the server/processor may determine a location and an event type associated with the report based on the information included in the report.

In block 406, the server/processor may identify types of sensors (e.g., speed sensors, pressure sensors, microphones, cameras, etc.) that are available in the determined location. In block 408, the server/processor may identify and select a subset of the identified sensors that are suitable for use in determining the veracity of the report based on the determined event type.

In block 212, the server/processor may poll the identified sensors to receive sensor information as described for the like number block in FIG. 2. In block 214, the server/processor may validate the veracity of the report based on the received sensor information, such as by corroborating the information included in the report based on the received sensor information as described for the like number block in FIG. 2.

Figure 5:
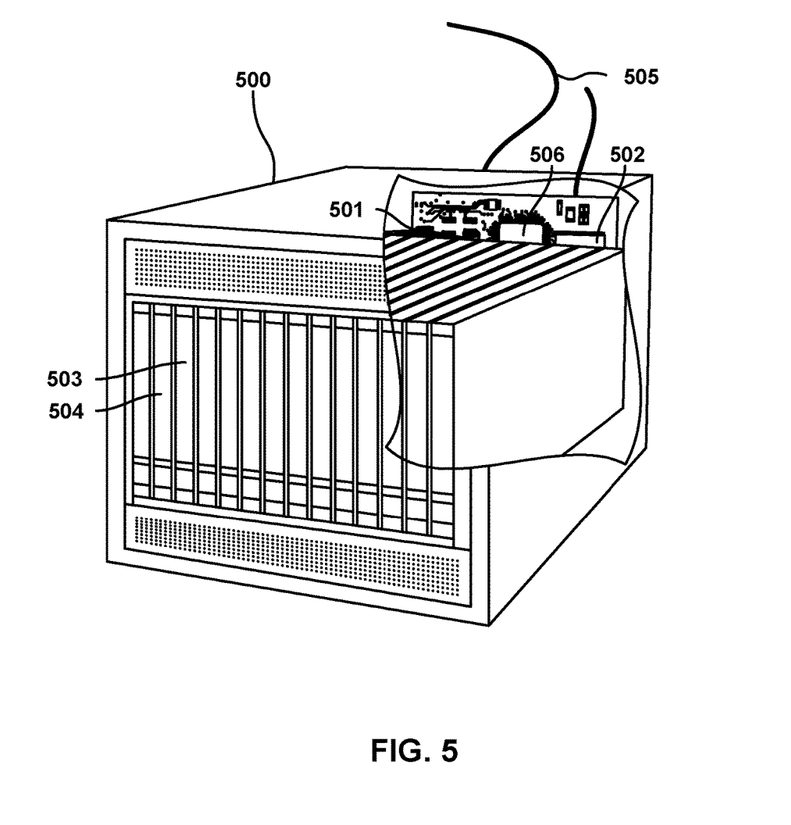
FIG. 5 is a component block diagram of a server device suitable for implementing various embodiments.

The various embodiments may be implemented on any of a variety of commercially available server devices, such as the server 500 illustrated in FIG. 5. Such a server 500 typically includes a processor 501 coupled to volatile memory 502 and a large capacity nonvolatile memory, such as a disk drive 503. The server 500 may also include a floppy disc drive, compact disc (CD) or digital versatile disc (DVD) disc drive 504 coupled to the processor 501. The server 500 may also include network access ports 506 coupled to the processor 501 for establishing data connections with a network 505, such as a local area network coupled to other broadcast system computers and servers.

The processor 501 may be any programmable microprocessor, microcomputer or multiple processor chip or chips that can be configured by software instructions (applications) to perform a variety of functions, including the functions of the various embodiments described below. In some mobile devices, multiple processors 501 may be provided, such as one processor dedicated to wireless communication functions and one processor dedicated to running other applications. Typically, software applications may be stored in the internal memory 502 before they are accessed and loaded into the processor 501. The processor 501 may include internal memory sufficient to store the application software instructions.

A number of different broadcast standards are available or contemplated in the future, any or all of which may be used various embodiments. Such services and standards include, e.g., Open Mobile Alliance Mobile Broadcast Services Enabler Suite (OMA BCAST), MediaFLO®, Digital Video Broadcast IP Datacasting (DVB-IPDC), Digital Video Broadcasting-Handheld (DVB-H), Digital Video Broadcasting-Satellite services to Handhelds (DVB-SH), Digital Video Broadcasting-Handheld 2 (DVB-H2), Advanced Television Systems Committee-Mobile/Handheld (ATSC-M/H), and China Multimedia Mobile Broadcasting (CMMB). Each of these broadcast formats involves, for example, a broadcast communication channel.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples, and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more processor-executable instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of determining the veracity of vehicle information corresponding to autonomous vehicles, comprising:
   determining, via a processor in a server computing device, whether vehicle information received from a reporting vehicle should be evaluated based on a result of comparing the received vehicle information to contextual information, wherein the processor in the server computing device determines whether the vehicle information includes suspicious information that should be evaluated with greater scrutiny, wherein the processor in the server computing device compares the received vehicle information to previous reports from the same vehicle, reports received from other vehicles or information in a road condition database;
   in response to determining that the vehicle information includes suspicious information, identifying, by the server computing device, sensors for polling based on the received vehicle information to identify a location of a segment of a road reported as blocked or area near a reported emergency and in response to determining, based on the result of comparing the received vehicle information to the contextual information, that the received vehicle information should be evaluated;
   polling, by the server computing device, the identified sensors to receive sensor information; and
   verifying, in the server computing device, the received vehicle information based on the received sensor information
   in response to determining that the vehicle information has not been successfully verified, the server computing device discarding the vehicle information and determining whether the reporting vehicle has been infected with malware or is experiencing a cyber-attack; and
   sending, by the server computing device, a control message to the reporting vehicle that includes information suitable for invoking a malware detection system in the reporting vehicle.

2. The method of claim 1, further comprising determining, in the server computing device, whether to perform a responsive action based on a result of the verification.

3. The method of claim 1, wherein verifying the received vehicle information based on the received sensor information comprises the server computing device comparing the received vehicle information to the received sensor information.

4. The method of claim 1, wherein the received vehicle information based on the received sensor information comprises:
   applying, in the server computing device, the received vehicle information to a first behavior model to generate a first value;
   applying, in the server computing device, received sensor information to a second behavior model to generate a second value; and
   labeling, by the server computing device, the received vehicle information as corroborated in response to determining that a difference between the first value and the second value exceeds a threshold value.

5. The method of claim 1, wherein identifying sensors for polling based on the received vehicle information comprises the server computing device identifying spatially relevant sensors based on location information included in the received vehicle information.

6. The method of claim 1, wherein identifying sensors for polling based on the received vehicle information comprises:

determining, in the server computing device, an applicable location based on the received vehicle information;

identifying, by the server computing device, a vehicle that is in close proximity to the applicable location; and identifying, by the server computing device, a sensor that is included in the identified vehicle.

7. The method of claim 1, wherein identifying sensors for polling based on the received vehicle information comprises the server computing device identifying a fixed road sensor based on the received vehicle information.

8. The method of claim 1, further comprising:

determining, in the server computing device, a number of sensors that should be polled in order to corroborate the received vehicle information, wherein identifying sensors for polling based on the received vehicle information comprises selecting the determined number of sensors for polling.

9. The method of claim 1, further comprising:

determining whether the received vehicle information is corroborated by the received sensor information;

storing the received vehicle information in a database in response to determining that the received vehicle information is corroborated by the received sensor information; and discarding the received vehicle information in response to determining that the received vehicle information is not corroborated by the received sensor information.

10. The method of claim 9, further comprising determining whether the reporting vehicle is infected with malware in response to determining that the received vehicle information is not corroborated by the received sensor information.

11. A server computing device, comprising:

a processor configured with processor-executable instructions to:

determine whether vehicle information received from a reporting vehicle should be evaluated based on a result of a comparison of the received vehicle information to contextual information, wherein the processor determines whether the vehicle information includes suspicious information that should be evaluated with greater scrutiny, wherein the processor compares the received vehicle information to previous reports from the same vehicle, reports received from other vehicles or information in a road condition database;

in response to determining that the vehicle information includes suspicious information, identify sensors for polling based on the received vehicle information to identify a location of a segment of a road reported as blocked or area near a reported emergency and in response to determining, based on the result of the comparison of the received vehicle information to the contextual information, that the received vehicle information should be evaluated;

poll identified sensors to receive sensor information; and verify the received vehicle information based on the received sensor information in response to determining that the vehicle information has not been successfully verified, discarding the vehicle information and determining whether the reporting vehicle has been infected with malware or is experiencing a cyber-attack; and sending a control message to the reporting vehicle that includes information suitable for invoking a malware detection system in the reporting vehicle.

12. The server computing device of claim 11, wherein the processor is further configured with processor-executable instructions to determine whether to perform a responsive action based on a result of the verification.

13. The server computing device of claim 11, wherein the processor is further configured with processor-executable instructions to verify the received vehicle information based on the received sensor information by comparing the received vehicle information to the received sensor information.

14. The server computing device of claim 11, wherein the processor is further configured with processor-executable instructions to verify the received vehicle information based on the received sensor information by:

applying the received vehicle information to a first behavior model to generate a first value;

applying received sensor information to a second behavior model to generate a second value; and labeling the received vehicle information as corroborated in response to determining that a difference between the first value and the second value exceeds a threshold value.

15. The server computing device of claim 11, wherein the processor is further configured with processor-executable instructions to perform identify sensors for polling based on the received vehicle information by identifying spatially relevant sensors based on location information included in the received vehicle information.

16. The server computing device of claim 11, wherein the processor is configured further with processor-executable instructions to identify sensors for polling based on the received vehicle information by:

determining an applicable location based on the received vehicle information;

identifying a vehicle that is in close proximity to the applicable location; and identifying a sensor that is included in the identified vehicle.

17. The server computing device of claim 11, wherein the processor is configured further with processor-executable instructions to identify sensors for polling based on the received vehicle information by identifying a fixed road sensor based on the received vehicle information.

18. The server computing device of claim 11, wherein:

the processor is further configured with processor-executable instructions to determine a number of sensors that should be polled in order to corroborate the received vehicle information; and the processor is further configured with processor-executable instructions to identify sensors for polling based on the received vehicle information by selecting the determined number of sensors for polling.

19. The server computing device of claim 11, wherein the processor is further configured with processor-executable instructions to:

determine whether the received vehicle information is corroborated by the received sensor information;

store the received vehicle information in a database in response to determining that the received vehicle information is corroborated by the received sensor information; and discard the received vehicle information in response to determining that the received vehicle information is not corroborated by the received sensor information.

20. The server computing device of claim 19, wherein the processor is further configured with processor-executable instructions to determine whether the reporting vehicle is infected with malware in response to determining that the received vehicle information is not corroborated by the received sensor information.

21. A non-transitory computer readable storage medium having stored thereon processor-executable software instructions configured to cause a processor in a server computing device to perform operations comprising:
determining whether vehicle information received from a reporting vehicle should be evaluated based on a result of comparing the received vehicle information to contextual information, wherein the processor in the server computing device determines whether the vehicle information includes suspicious information that should be evaluated with greater scrutiny, wherein the processor in the server computing device compares the received vehicle information to previous reports from the same vehicle, reports received from other vehicles or information in a road condition database;
in response to determining that the vehicle information includes suspicious information, identifying sensors for polling based on the received vehicle information to identify a location of a segment of a road reported as blocked or area near a reported emergency and in response to determining that the received vehicle information should be evaluated;
polling identified sensors to receive sensor information; and
verifying the received vehicle information based on the received sensor information,
in response to determining that the vehicle information has not been successfully verified, the server computing device discarding the vehicle information and determining whether the reporting vehicle has been infected with malware or is experiencing a cyber-attack; and
sending, by the server computing device, a control message to the reporting vehicle that includes information suitable for invoking a malware detection system in the reporting vehicle.

22. The non-transitory computer readable storage medium of claim 21, wherein the stored processor-executable software instructions are configured to cause a processor to perform operations further comprising determining whether to perform a responsive action based on a result of the verification.

23. The non-transitory computer readable storage medium of claim 21, wherein the stored processor-executable software instructions are configured to cause a processor to perform operations such that verifying the received vehicle information based on the received sensor information comprises comparing the received vehicle information to the received sensor information.

24. The non-transitory computer readable storage medium of claim 21, wherein the stored processor-executable software instructions are configured to cause a processor to perform operations such that verifying the received vehicle information based on the received sensor information comprises:
applying the received vehicle information to a first behavior model to generate a first value;
applying received sensor information to a second behavior model to generate a second value; and
labeling the received vehicle information as corroborated in response to determining that a difference between the first value and the second value exceeds a threshold value.

25. The non-transitory computer readable storage medium of claim 21, wherein the stored processor-executable software instructions are configured to cause a processor to perform operations such that identifying sensors for polling based on the received vehicle information comprises identifying spatially relevant sensors based on location information included in the received vehicle information.

26. The non-transitory computer readable storage medium of claim 21, wherein the stored processor-executable software instructions are configured to cause a processor to perform operations such that identifying sensors for polling based on the received vehicle information comprises:
determining an applicable location based on the received vehicle information;
identifying a vehicle that is in close proximity to the applicable location; and
identifying a sensor that is included in the identified vehicle.

27. The non-transitory computer readable storage medium of claim 21, wherein the stored processor-executable software instructions are configured to cause a processor to perform operations such that identifying sensors for polling based on the received vehicle information comprises identifying a fixed road sensor based on the received vehicle information.

28. The non-transitory computer readable storage medium of claim 21, wherein:
the stored processor-executable software instructions are configured to cause a processor to perform operations further comprising determining a number of sensors that should be polled in order to verify the received vehicle information; and
the stored processor-executable software instructions are configured to cause a processor to perform operations such that identifying sensors for polling based on the received vehicle information comprises selecting the determined number of sensors for polling.

29. The non-transitory computer readable storage medium of claim 21, wherein the stored processor-executable software instructions are configured to cause a processor to perform operations further comprising:
determining whether the received vehicle information is corroborated by the received sensor information;
storing the received vehicle information in a database in response to determining that the received vehicle information is verified by the received sensor information;
discarding the received vehicle information in response to determining that the received vehicle information is not verified by the received sensor information; and
determining whether the reporting vehicle is infected with malware in response to determining that the received vehicle information is not corroborated by the received sensor information.

30. A server computing device, comprising:
means for determining whether vehicle information received from a reporting vehicle should be evaluated based on a result of comparing the received vehicle information to contextual information, wherein the server computing device determines whether the vehicle information includes suspicious information that should be evaluated with greater scrutiny, wherein the server computing device compares the received vehicle information to previous reports from the same vehicle, reports received from other vehicles or information in a road condition database;

in response to determining that the vehicle information includes suspicious information, means for identifying sensors for polling based on the received vehicle information to identify a location of a segment of a road reported as blocked or area near a reported emergency and in response to determining, based on the result of comparing the received vehicle information to the contextual information, that the received vehicle information should be evaluated;

means for polling identified sensors to receive sensor information; means for verifying the received vehicle information based on the received sensor information;

in response to determining that the vehicle information has not been successfully verified, means for discarding the vehicle information and means for determining whether the reporting vehicle has been infected with malware or is experiencing a cyber-attack; and means for sending a control message to the reporting vehicle that includes information suitable for invoking a malware detection system in the reporting vehicle.

\* \* \* \* \*